United States Patent
Goldenthal et al.

(10) Patent No.: US 9,123,175 B1
(45) Date of Patent: Sep. 1, 2015

(54) POSE SPACE SIMPLICIAL INTERPOLATION

(75) Inventors: Adrian R. Goldenthal, San Francisco, CA (US); Julien F. Cohen Bengio, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 483 days.

(21) Appl. No.: 13/538,018

(22) Filed: Jun. 29, 2012

(51) Int. Cl.
*G06T 13/40* (2011.01)
*G06T 13/00* (2011.01)

(52) U.S. Cl.
CPC *G06T 13/40* (2013.01); *G06T 13/00* (2013.01)

(58) Field of Classification Search
None
See application file for complete search history.

(56) References Cited

U.S. PATENT DOCUMENTS

| 7,307,633 | B2 * | 12/2007 | Anderson et al. | 345/473 |
| 2004/0001064 | A1 * | 1/2004 | Boyd et al. | 345/473 |
| 2007/0171227 | A1 * | 7/2007 | Anderson et al. | 345/473 |

OTHER PUBLICATIONS

Delingette et al. Simplex based animation. Computer Animation'93, Models and Techniques in Computer Animation, Computer Graphics International Geneva, Switzerland, pp. 13-28.*

Mohr et al. Building Efficient, Accurate Character Skins from Examples, SIGGRAPH '03 ACM SIGGRAPH 2003, p. 562-568.*
Mohr et al. Direct Manipulation of Interactive Character Skins, I3D '03 Proceedings of the 2003 symposium on Interactive 3D graphics, p. 27-30, herein after referred as Mohr'I3D.*
Sloan, et al. "Shape by Example" *In Proceedings of the 2001 Symposium on Interactive 3D Graphics* 9 pages.
Weber, et al. "Context-Aware Skeletal Shape Deformation" *Computer Graphics Forum (Proceedings of Eurographics)* vol. 26, No. 3, (2007) 9 pages.
Pose, et al. "Pose Space Deformation: A Unified Approach to Shape Interpolation and Skeleton-Driven Deformation" *SIGGRAPH '00 Proceedings of the 27th annual conference on Computer graphics and interactvie techniques* 8 pages.
"Maya Rigging" [online] [retrieved on Jun. 20, 2012] Retrieved from the Internet: http://web.archive.org/web/20070126145138/http://www.tokeru.com/twiki/bin/view/Main/ . . . (May 26-29, 2006), 14 pages.
Michael B. Comet, "poseDeformer—Pose Space Deformer Maya Plugin" Retrieved from the Internet: http://www.comet-cartoons.com/MELfiles/poseDeformer.html (2004) 4 pages.

* cited by examiner

*Primary Examiner* — Yingchun He
(74) *Attorney, Agent, or Firm* — Kilpatrick Townsend & Stockton LLP

(57) ABSTRACT

An animation rig is displayed in a plurality of reference poses. The animation rig has a pose deformation in each pose. A refinement deformation for each reference pose is received. Each refinement deformation is mapped to a respective point in n-dimensional space. A complex is built in the n-dimensional space. The complex includes a mesh of simplices, each corner of each simplex associated with one of the deformations.

24 Claims, 6 Drawing Sheets

POSE SPACE SIMPLICIAL INTERPOLATION

TECHNICAL FIELD

This document relates to computer modeling.

BACKGROUND

Some processes for animating a character involve creating an animation rig for the character. The animation rig defines a jointed structure within the character, often a group of bones and joints. Some animation rigs have other structures that can be deformed based on the state of one or more bones or joints. For example, a rig may be enveloped so that the skin of the rig deforms based on the state of the joints. As this type of rig moves, the skin changes shape based on changes in the size and shape of the muscles of the rig.

SUMMARY

In one aspect, a method includes displaying an animation rig in a plurality of reference poses. The animation rig has a pose deformation in each pose. The method further includes receiving refinement deformations for each reference pose. The method further includes mapping each refinement deformation to a respective point in n-dimensional space. The method further includes building, using one or more processors, a complex in the n-dimensional space. The complex includes a mesh of simplices, each corner of each simplex associated with one of the deformations.

Implementations can include any, all, or none of the following features. The method including receiving a new pose, the new pose not being one of the reference poses; identifying a point in a simplex based on the new pose; and creating a new refinement deformation for the new pose by interpolating the deformations of the simplex for the point, the interpolation being a simplicial interpolation. Interpolating the deformations of the simplex for the point includes estimating barycentric weights for the deformations of the simplex for the point, the estimated barycentric weights having an error; and adjusting the estimated barycentric weights to reduce the error. The method including receiving an animation sequence of new poses; creating a sequence of new refinement deformations for the sequence of new poses; and creating a refined animation sequence of the new poses in which the new refinement deformations are applied to the new poses. The method including displaying the animation sequence to a user; receiving an approval input from the user indicating approval of the animation sequence; and wherein the sequence of new refinement deformations are created in response to receiving the approval input. Displaying the animation rig, receiving refinement deformations, and building an complex of simplices is performed at a modeling computer system; and receiving a new pose and creating a new refinement deformation is performed at an animation computer system, the modeling computer system and the animation computer system being different computer systems. Displaying the animation rig, and receiving refinement deformations is performed at a modeling computer system, the method further including storing, by the modeling computer system, the refinement deformations in association with the animation rig; loading, in an animation computer system that is different than the modeling computer system, the animation rig and the refinement deformations; and responsive to loading the refinement deformation, the modeling computer system performs the building a complex of simplices. Identifying a point in a simplex based on the new pose includes identifying a new point in the n-dimensional space respective with the new pose, the new point being outside of the complex of simplices; and identifying the nearest point in a simplex to the new point. Each pose is defined as an n-dimensional vector in the n-dimensional space; and each element of the vector represents one degree of freedom of one joint of the animation rig. The n-dimensional space is six-dimensional space; three of the dimensions represent three degrees of freedom of one joint of the animation rig; and three of the dimensions represent three degrees of freedom of another joint of the animation rig. Building a complex of simplices results in a complex of simplices that are non-degenerate. Building a complex of simplices results in a complex of simplices with no interior angle greater than a threshold angle. Building a complex in the n-dimensional space includes building an initial complex in the n-dimensional space including a mesh of simplices, each corner of each simplex associated with one of the deformations; identifying a property of a simplex of the initial complex; creating, responsive to identifying a property of the complex; an additional reference pose having an associated refinement deformation and an associated point in the n-dimensional space; and building the complex such that no simplex of the complex has the identified property. The poses are defined by m joint deformations, m being greater than n, the method further comprising: identifying n dimensions needed to describe the m joint deformations of all poses by principal component analysis.

In one aspect, a method includes receiving a) refinement deformations for a plurality of reference poses, b) a mapping of the deformations to an n-dimensional space, and c) a complex of simplices in the n-dimensional space, each corner of each simplex respective with one of the deformations. The method further includes receiving a new pose, the new pose not being one of the reference poses. The method further includes identifying a point in a simplex based on the new pose. The method further includes creating, by a computer system, a new refinement deformation for the new pose by interpolating the deformations of the simplex for the point, the interpolation being a simplicial interpolation.

In one aspect, a system includes one or more processors. The system further includes a computer-readable medium having stored therein instructions that when executed generate an animation system configured to display an animation rig in a plurality of reference poses, the animation rig having a pose deformation in each pose. The instructions further receive refinement deformations for each reference pose. The instructions further map each refinement deformation to a respective point in n-dimensional space. The instructions further build a complex in the n-dimensional space includes a mesh of simplices, each corner of each simplex associated with one of the deformations.

In one aspect, a system includes one or more processors. The system further includes a computer-readable medium having stored therein instructions that when executed generate an animation system configured to: receive a) refinement deformations for a plurality of reference poses, b) a mapping of the deformations to an n-dimensional space, and c) a complex of simplices in the n-dimensional space, each corner of each simplex respective with one of the deformations. The instructions further receive a new pose, the new pose not being one of the reference poses. The instructions further identify a point in a simplex based on the new pose. The instructions further create, by a computer system, a new refinement deformation for the new pose by interpolating the deformations of the simplex for the point, the interpolation being a simplicial interpolation.

One or more implementations of the techniques described in this document may provide one or more of the following advantages. Details of training poses that are not modeled by an animation rig may be preserved for use in new poses. Modifying and blending training pose deformation may produce desirable deformations when a well-muscled character is being animated. Blending deformations with simplicial interpolation can produce expected deformations when many training poses are used, and overshoot poses may be deformed in predictable ways. When an animation pose matches a training pose, the deformations of the training pose may be used as deformations for the animation pose. Deformation results for animation poses may be continuous if the training poses of a single simplex do not contradict each other (e.g., one pose fully inflating an envelope and another fully deflating the same envelope). The system may be configured to keep the same properties when extending the dimensionality of the poses, for example as long as degenerate simplices are avoided.

DESCRIPTION OF DRAWINGS

Like reference symbols in the various drawings indicate like elements.

DETAILED DESCRIPTION

A general purpose animation rig can be refined to more accurately depict a character. To do so, the animation rig is placed in a number of training poses. In each training pose, a modeler refines, or trains, the rig with a set of deformations. This can result in the animation rig taking a more accurate appearance in the training poses. Later, when the animation rig is animated, the deformations for the training poses may combined by simplicial interpolation to create a deformation for any new pose. This can result in the character's skin taking on a more accurate appearance in any pose.

Figure 1:
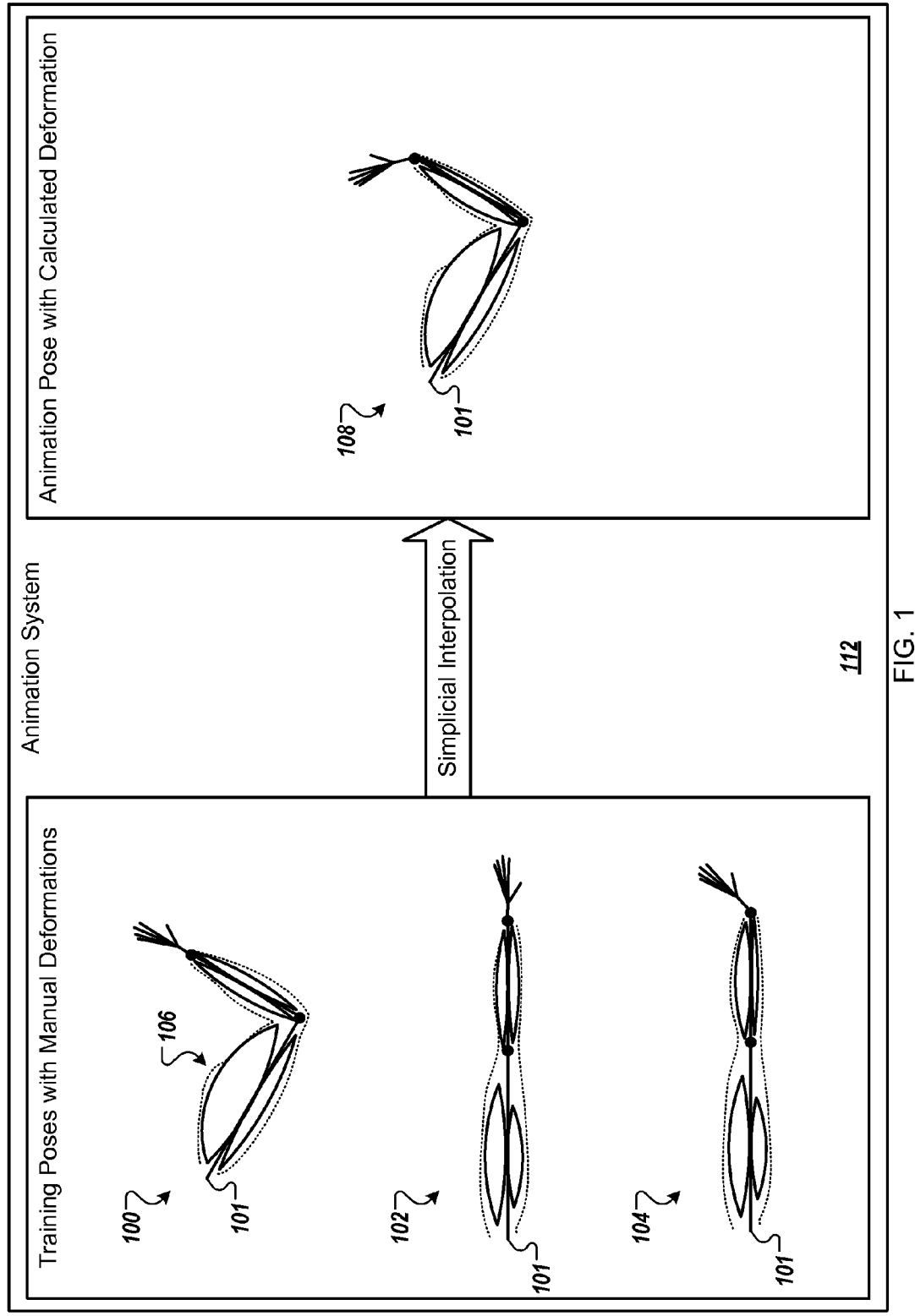
FIG. 1 shows an example of three training poses of a character's arm that are interpolated to create a new pose for the character's arm.

FIG. 1 shows an example of three training poses 100, 102, and 104 of a character's arm in an animation system 112. The character's arm contains moveable elements (e.g. joints) that may be manipulated to place the arm in different poses. Here, each training pose 100, 102, and 104 receives a refinement deformation. When the arm is put into a new pose, a new deformation is created by applying simplicial interpolation of the refinement deformations, effectively producing a new shape for the arm even though it may never have been put in the new pose before.

The arm includes an animation rig 101 that has, in this case, a series of rigid structures representing the bones of a human arm. As the arm is moved into different poses, deformable portions of the rig representing soft tissue are deformed programmatically. For example, when the arm bends, muscle structures bulge and deflate. These pose deformations may be based on real anatomical measurements, but may not accurately create deformations appropriate to every character. For example, it may be determined that for the average person, an elbow bent at a particular angle results in an average deformation to a muscle. However, animated characters may differ from the average person. Some characters may be particularly muscular or unmuscular, some may have greater or less body fat than average, and some characters (e.g. cartoons) may have overly exaggerated deformations.

In order to more accurately describe a particular character's shape in the training poses 100, 102, and 104, a user may apply refinement deformations to each pose. The refinement deformations are adjustments to the rig deformations created by changes to an animation rig's poses. For example, in pose 100, the animation rig may create an rig deformation of the character's bicep so that it has a smooth arc across the top. A user may apply a refinement deformation 106 to the character's bicep to change the appearance of the character when the elbow is bent. This refinement deformation 106 may represent either realistic or unrealistic details. That is, the pose deformations may be corrections to more accurately reflect the character's physiology or the pose deformations may be artistic changes to reach some desired, but unrealistic, appearance. In some implementations, these training poses 100, 102, and 104 may be based on a reference drawing of the character. The character in these drawings may be in canonical or extreme poses. For example, a gunfighter character might have one pose in which the character stands hunched over with its hand by the gun, and another pose standing straight upright.

The poses 100, 102, and 104 can be defined by two variables each—an elbow angle and a wrist angle. The elbow angle in pose 100 is 90° and is 0° in poses 102 and 104. The wrist angle is 0° in poses 100 and 102 and 30° in pose 104. However, the animation rig may take a wide range of poses beyond the three training poses 100, 102, and 104. For example, the animation rig may be used in an animation scene (e.g., a video game or motion picture). The animation (e.g., user input or keyframe animation) of the animation scene may place the rig into new poses. For example, in pose 108, the elbow is at 88° and the wrist is at 33°. The rig may generate a rig deformation based on this pose. In addition to the rig deformation, a new refinement deformation based on the refinement deformations of poses 100, 102, and 104 can be generated and applied to the rig. One process for combining these refinement deformations is by simplicial interpolation. This process may be repeated for many new poses, including a sequence of poses generated as part of an animation sequence. As such, an animation scene may be created in which every frame of the animation incorporates the refinement deformations of the poses 100, 102, and 104 without requiring a modeler to create custom refinement deformations for every frame.

Figure 2:
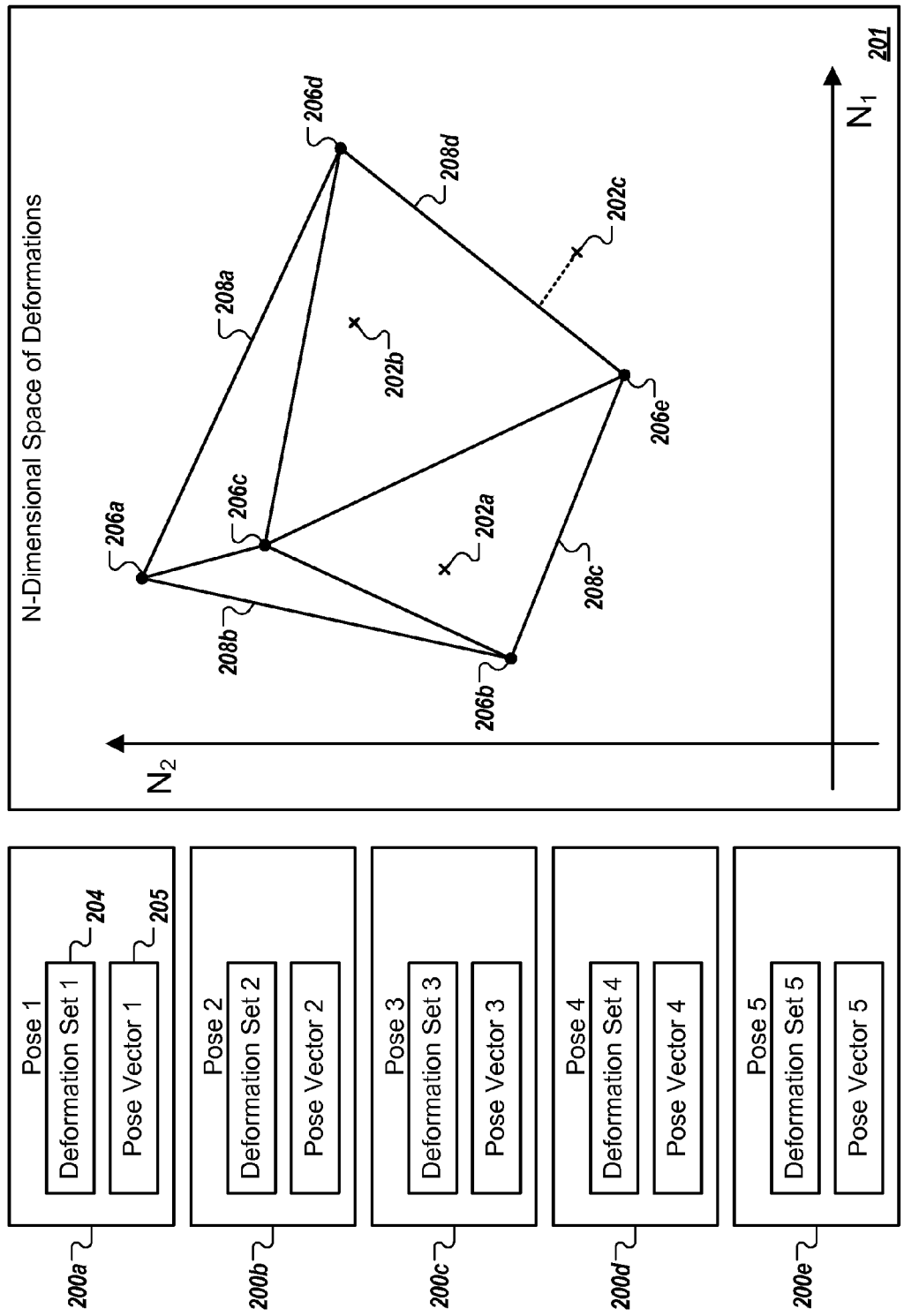
FIG. 2 shows an example of training poses schematically mapped to an n-dimensional space and new poses with deformations interpolated from the training poses.

FIG. 2 shows an example of training poses 200a-e schematically mapped to an n-dimensional space 201 and new poses 202 with deformations interpolated from the training poses. In this example, five training poses 200a-200e have been created for an animation character. Training pose 200a may have an associated deformation set 204. The deformation set may be, for example, a set of deformation vectors to be applied to vertices of the animation character's mesh when the rig in training pose 200a. The deformation set may be created, for example, by a modeler use applying refinements to an initial deformation of an animation rig. The other training poses 200b-e may also have similar deformation sets.

The training poses 200a also may have an associated n-dimensional pose vector 205. The pose vector 205 defines the shape of the animation character in training pose 200a. Each element of the pose vector may represent one degree of freedom used to define the animation character's training pose 200a. For example, an arm with two degrees of freedom (a wrist angle and an elbow angle) may have pose vector with two elements, one for each degree of freedom. The other training poses 200b-e may also have similar deformation sets.

For purposes of clarity, the example shown in FIG. 2 uses an n value of two. That is, the pose vectors 205 and n-dimensional space 201 are both two dimensional. However, other n values are possible (e.g. any other positive integer). For example, a model of an arm may have three degrees of freedom for an elbow joint and three degrees of freedom for the wrist. In this case, six dimensional vectors and six dimensional space may be used.

In some cases, the number of dimensions of the pose vectors 205 and n-dimensional space 201 may be less than the number of degrees of freedom in the rig. Two example cases include if the animation character is constrained so that some joint angles never change, or an animation may never call for a particular joint angle to change. In these cases, the actual movements of the character may be analyzed, for example by principal component analysis, and a lower or minimum number of dimensions needed to describe the movements may be found. This lower or minimum number may be used for the number of dimensions of the vectors and n-dimensional space. This process may be useful, for example, to reduce the overall computing costs of generating a final animation in two main ways. Firstly, the number of required training poses depends on the dimension of the problem. Generally, lower dimensionality requires less work on the modeler side. Secondly, the performance of the system is affected by the dimension of the problem; fewer dimensions may make the system respond and run quicker.

The poses 200a-e, which have n-dimensions, are mapped to their respective points 206a-e in an n-dimensional space 201. Unless two poses 200 have the same joint angles, and are thus identical, no two poses 200a-e will have the same point 206a-e in the n-dimensional space. As shown here, the points 206a-e may not be evenly spaced throughout the n-dimensional space. In some implementations, any density and distribution of points 206a-e is possible.

Once the poses 200-ae are mapped to the n-dimensional 201 space, a complex of simplices 208a-d is created using the points 206a-e as corners of the simplices. Simplices, as used here, are polygons in n-dimensional space with n+1 corners and n+1 sides. For example, in a two dimensional space, a simplex is a triangle, and in a three dimensional space, a simplex is a four-pointed pyramid. A mesh of simplices in the same space will be referred to as a complex.

Degenerate simplices are simplices that may be described with n or fewer points. In some cases, the occurrence of degenerate simplices can be reduced by training to avoid training certain poses that are likely to lead to degenerate simplices (e.g. poses in which one joint value is different than another pose). Additionally or alternatively, some processes for creating the complex avoid, prevent, or remove degenerate simplices. That is, the complex may be built such that it contains no simplices that can be described with only n points, or the complex may be analyzed after creation to identify degenerate simplicials and remove them. This complex may then be used when generating deformations for a new pose, such as a pose in an animation scene.

The new poses can be represented by new vectors 202a-e, which are n-dimensional vectors with the same format as the pose vectors. The n-dimensional vectors are displayed graphically as points in the n-dimensional space 201. In the example of pose vectors 205 storing [elbow angle], [wrist angle], the new vector 202a-e would also store [elbow angle], [wrist angle].

The new vectors 202a-e can be mapped into the n-dimensional space. Some of the new vectors 202a and 202b may be inside a simplex. In this case, the n+1 corners of that simplex are used to create a new deformation for the new pose. For example, a simplicial interpolation can be used to find weights for each point of the simplex. These weights, which can add to a sum of 1 or 100%, may reflect the relative volume the new vector 202 forms with respect to each corner of the simplex. The new deformation can be calculated by combining the deformation sets for the poses of the corners of the simplex, weighted according to the simplicial interpolation.

Some of the new vectors may be outside of the simplex, like the new vector 202c in this example. This may be, as shown in this example, because there is no way to construct the complex to contain the new vector 202c. In other cases, although a complex has a concavity such that a simplex containing the new vector 202c could be created from the points of the complex, no such simplex may have been created. In either case, the new pose may be calculated in the same way. That is, instead of using simplicial interpolation on the point of the new vector 202c, the nearest point within a complex is found, and that nearest point is used instead.

In some implementations, this creates deformations that behave in a way that is intuitive to a human observer—either an animator or the audience of an animation. For example, an character's canonical poses may not include any with an elbow angle greater than 90°. As such, no training poses 200a-e may exist in which an elbow is bent past 90°. A new pose, however, may bend the elbow to 115°. In this case, the new deformation will be based on the elbow at or near 90°, which may be intuitive to some viewers.

Figure 3:
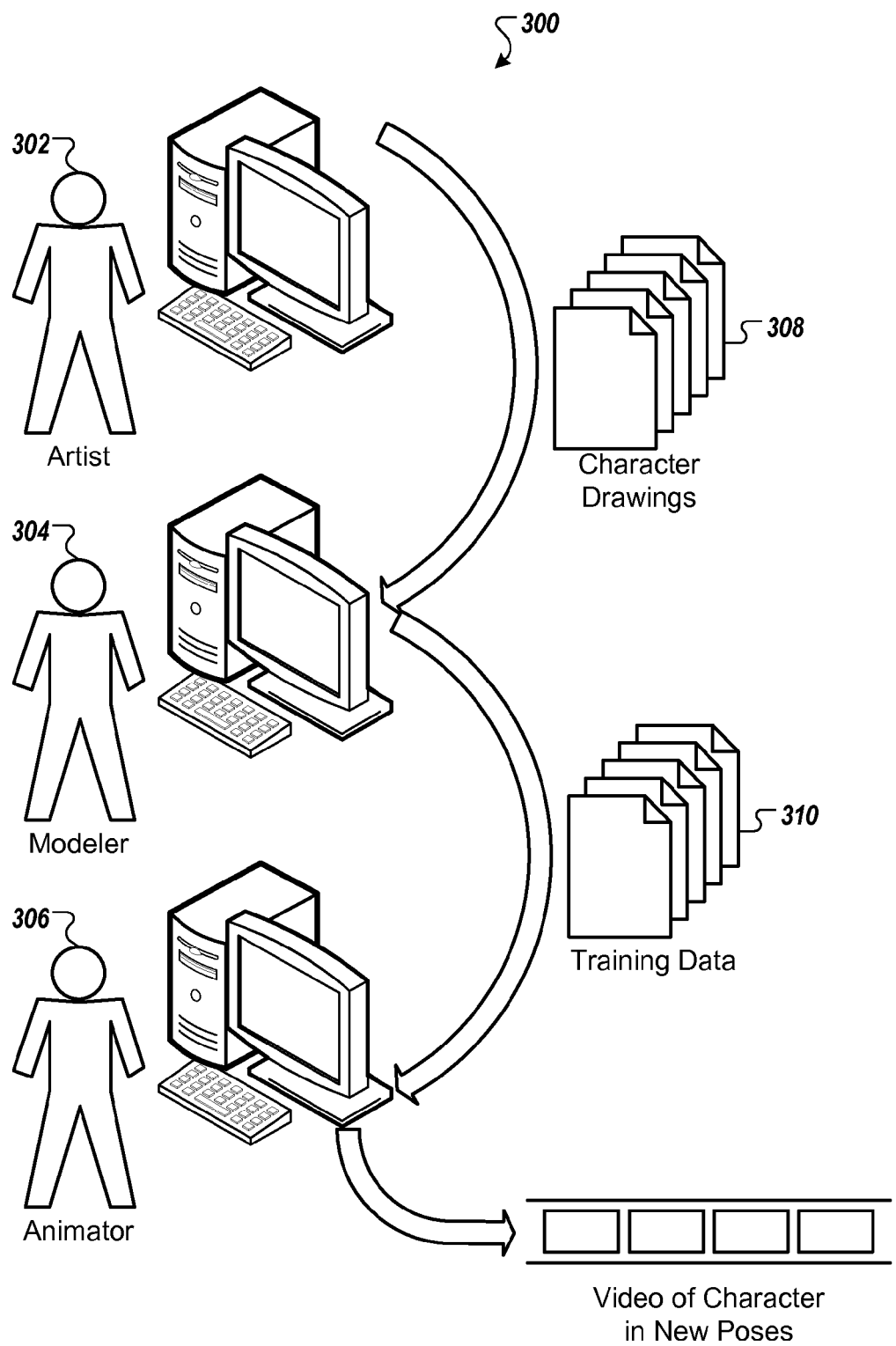
FIG. 3 shows an example workflow for generating an animation.

FIG. 3 shows an example workflow 300 for generating an animation. This workflow shows one example process for generating a character model, creating refinement deformations for the character, and animating the character with new deformations interpolated from the refinement deformations. The tasks in this workflow are split between an artist 302, modeler 304, and animator 306. These three users may all be part of the same organization, or may be split across different organizations. For example, all three users may work for the same movie studio that is producing a movie with an original character. In another example, the artist 302 may work for a comic book publisher, the modeler 304 may be a video game developer who is developing a video game based on the comic book publisher's properties, and the animator 306 may be either an animator working for the video game developer or may be a customer who has purchased and is playing the video game. It will be understood that there may be more than one of each type of user, for example there may be many modelers 304 each working to create refinement deformations for different poses. It will also be understood that different workflows can be used to produce the same or similar processes.

The artist 302 begins by creating character drawings 308 that define the appearance of a character to be animated. These character drawing 308 may take any form and format that conveys visual information about the character. In some cases, the character drawings 308 may be reused from previous work. In the example of the comic book company, existing concept art and comic book art used in the standard production of comic books may be reused as character drawings 308. In some examples, the character drawings are created specifically for the workflow 300.

The character drawings 308 may or may not be realistic. That is, the character may or may not conform to the appearance of real humans, animals, etc. The depicted character may be a realistic human or animal, an anthropomorphic animal, a robot, a stylized human, to name a few examples, or any other creature or object that may be animated. It may happen that the character is not consistent with any off-the-shelf animation rig. For example, an angel character may have different musculature on its back to account for the wings, and a normal human rig may not reflect this musculature.

The modeler 304 can receive the character drawings 308 for purposes of obtaining a rig for the animation. Because the character in this example is not consistent with any existing animation rig, the modeler can use the character drawings to modify an animation rig so that it is consistent with the character drawings 308. The modeler may select a rig, for example, from a library of animation rigs (e.g., an adult male, adult female, child, or different animals and robots). Alternatively, the modeler 304 may have access to a rig specifically build for the character. In either case, this rig, even if designed specifically for this character, may not reflect the character as shown in the character drawings 308. In some cases, this may be due to the limitations on the amount of detail possible with an animation rig. In other cases, it may be because the shape of a character may be inconsistent from pose to pose in the character drawings 308.

For purposes of modifying the animation rig, the modeler 304 can define a group of reference poses for the animation rig. These reference poses may include, for example, poses depicted in the character drawings 308 and/or poses that are useful for fully describing the shape of the character. These useful poses may include, for example, common poses (e.g., standing, sitting, midstride) and extreme poses (e.g., poses where some joints are bent to their greatest angles).

For each pose, the modeler 304 can apply refinement deformations to change the shape of the animation rig from its default deformation for that pose to a desired deformation based on the character drawings 308. For example, one of the character drawings 308 may show the character in a muscle-flexing pose. The modeler 304 may, using that character drawing 308 as a reference, place the animation rig in the same pose. In response to this placement, the animation rig will deform according to rules that are embedded in the animation rig. These rules may cause the animation rig to assume a shape that is near to, but not exactly like, the character as it is depicted in the character drawings 308. The modeler 308 may then apply refinement deformations to the rig in that pose so that it more accurately reflects what is shown in the character drawing.

The modeler 304 may then store the training poses and refinement deformations as training data 310 with the animation rig. In some cases, it is at this point that the training poses are mapped to an n-dimensional space and that a complex of simplices is constructed. If the complex is created at this point, it is also stored with the animation rig.

Once all training poses have been defined and refinement deformations have been created for each training pose, the animator 306 can receive the animation rig and the training data 310. If, for example, the complex was not created by the modeler 304, the animator 306 can create the complex and store the complex with the animation rig.

The animator 306 can animate the animation rig, using the refinement deformations to create new deformations for the rig at each frame of the animation. This animation may take any appropriate form, including offline (e.g., preprocessed keyframe animation) or online (e.g., dynamic movements based on a user input, such as in a video game).

In some cases, the animator 306 may make a first pass of the animation without creating and applying the new deformations. Creating this first pass may be less resource intensive and thus faster than creating the animation with the new deformations. This may be preferable for the animator 306 because it may allow the animator 306 to previsualize the animation without having to wait for the new deformations to be calculated and applied. Then, once the animator 306 has approved the scene, the animator 306 can generate and apply the new deformations.

Figure 4:
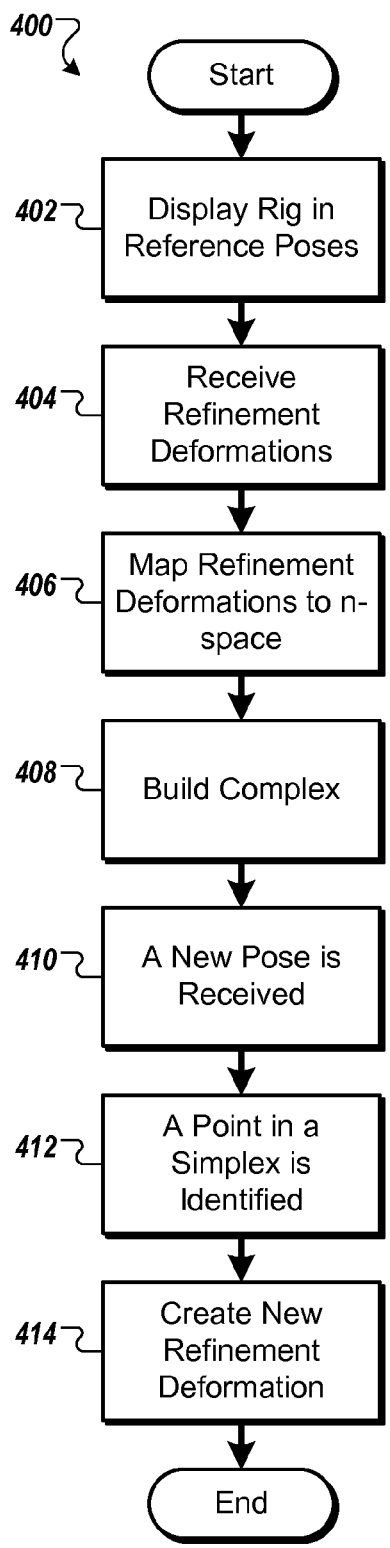
FIG. 4 shows a flowchart of an example process for deforming an animation rig.

FIG. 4 shows a flowchart of an example process 400 for deforming an animation rig. The process 400 can be performed by a processor executing instructions stored in a computer-readable medium, such as in the animation system 112 (FIG. 1). For illustrative purposes, the process will be described with reference to the animation system 112. However, other systems may perform one or more operations of the process 400.

An animation rig is displayed in a plurality of reference poses (402). The animation rig has a pose deformation in each pose. For example, a user may load an animation rig into the animation system 112 and then direct the animation system 112 to place the animation rig into a pose. The animation system 112 can respond by placing the rig in the instructed pose and deform the shape of the animation rig according to the rules of the animation rig. This may be repeated for one or more poses.

Refinement deformations are received for each reference pose (404). For example, for each pose, the user may input desired changes to the shape of the animation rig into the animation system 112. In response, the animation system 112 can calculate refinement deformations for the pose that refine the shape of the animation rig.

Each refinement deformation is mapped to a respective point in an n-dimensional space (406). For example, each pose may be defined by the joint angle values that the rig has in that pose. The animation system 112 can create n-dimensional vectors from these joint angle values, with each vector describing a point in an n-dimensional space.

A complex comprising a mesh of simplices is built in the n-dimensional space using one or more processors (408). Each corner of each simplex is associated with one of the deformations. For example, the animation system 112 can create a mesh of non-overlapping, connected shapes with n+1 sides and n+1 corners. Each corner of each shape can be one of the n-dimensional vectors associated with a pose, and every n-dimensional vector may be used as at least one corner of one or more shapes. The animation system 112 may generate the complex, or may post process the complex, such that it contains only simplicials that are non-degenerate.

One technique that may be used for building a complex is known as Delaunay triangulation. In a Delaunay triangulation, a complex is created such that no point is inside the circumcircle of any simplex of the complex.

A new pose that is not one of the reference poses is received (410). For example, the animation system 112 may create an animation of the animation rig, and for some or all of the frames of the animation, the rig may assume a pose for which no refinement deformation exists.

A point in a simplex is identified based on the new pose (412). For example, for every new pose in the animation, the animation system 112 can create an n-dimensional vector. If that vector is contained by one of the simplices of the complex, that vector is used to create a new refinement deformation.

However, if that vector is not contained by any of the simplices of the complex, the animation system can identify a point within a simplex and use that point to create a new refinement deformation. One way in which the animation system 112 can identify a point within a simplex when the vector is not within a simplex is by finding the nearest point within the nearest simplex.

A new refinement deformation for the new pose is created by interpolating the deformations of the simplex for that point (414). The interpolation is a simplicial interpolation. For example, the animation system 112 can create a new refinement deformation by blending the refinement deformations associated with the poses described by the corners of the simplex that contains the identified point. This blending can be a weighted blending, and the animation system may find the weights to use by performing a simplicial interpolation. In some implementations, barycentric coordinates are used to find this weighting. For example, the identified point may be treated as the barycenter of masses placed at each corner of the simplex, and the weights for the blending may be based on the masses calculated.

One process for finding barycentric weights for the new pose can involve iterating over every simplex of the complex and estimating the weight of each corner for each simplex. For example, a function to estimate barycentric weights for a new point and a simplex may return weights with an epsilon (error) on the weights to be below zero or above one. The presence of epsilon values may indicate that the function has actually solved for weights at a point—here called a solve point—that is different than the new point. That is, the weights as returned may be associated with a barycentric coordinate that is different than the new point. The distance in n-space between the solved point and the new point represents the error in the estimation. The estimation function can be repeated until a simplex with no error is found, or the error in the estimation is below a threshold. Additionally or alternatively, the barycentric weights may be adjusted to reduce the error. For example, barycentric weights that are below zero or above one may be penalized (reduced in magnitude). If all weights are below zero or above one, some of the weights may be adjusted. For example, points that are farthest from the edges or nearest the geometric center of the simplex may be favored, and fewer weights can be favored. In some cases, use of one non-zero weight may result in a better solution than two non-zero weights.

In the case of a sequence of new poses, such as in an animation sequence, the animation system 112 may create a sequence of new refinement deformations. In some implementations, the animation system 112 can generate the sequence of new poses while generating the animation sequence and display the animation sequence to the user with the new refinement deformations.

In some other cases, the animation system 112 may first generate and display the animation sequence without creating and including the new refinement deformations. In some implementations, a user will first review and approve the animation sequence, for example by providing an approval input to the animation system 112, and the animation system 112 will then create the new refinement deformations and display the animation sequence with the new refinement deformations included.

Figure 5:
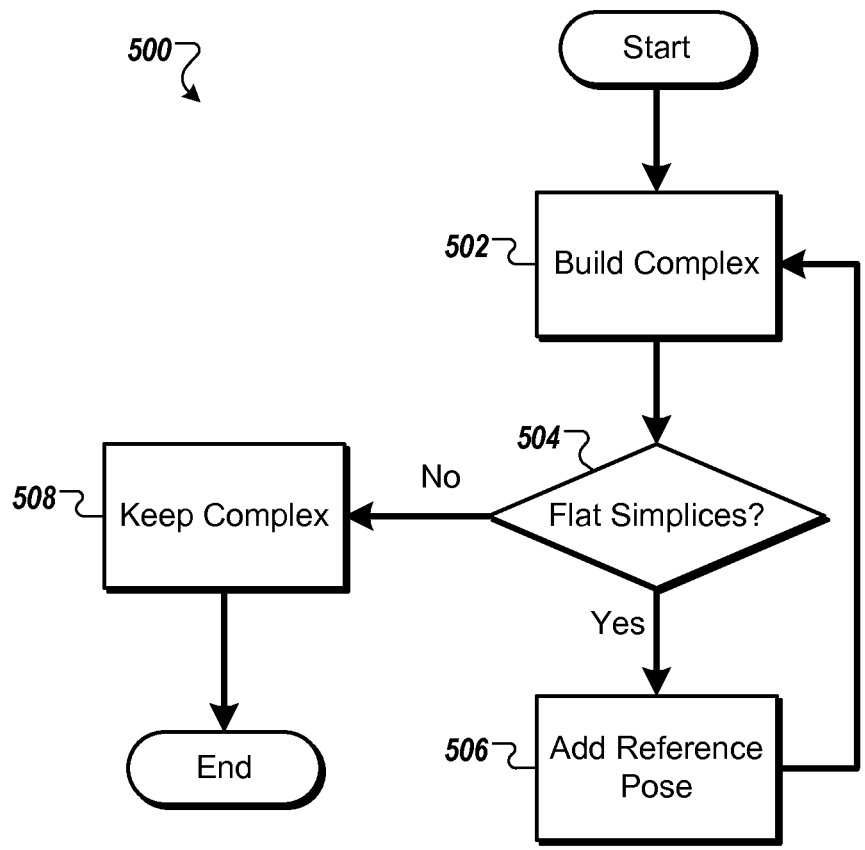
FIG. 5 shows a flowchart of an example process for creating a complex without flat simplices.

FIG. 5 shows a flowchart of an example process 500 for creating a complex without flat simplices. The process 500 can be performed by a processor executing instructions stored in a computer-readable medium, such as in the animation system 112 (FIG. 1). For illustrative purposes, the process will be described with reference to the animation system 112. However, other systems may perform one or more operations of the process 500.

In some implementations, the triangulation of the pose space may be a driver of good results. Sometimes, triangulation algorithms used to construct a complex of simplices will produce flat simplices—simplices that have a very obtuse angle. The exact value where the angle is too obtuse may differ from implementation to implementation. In cases in which a simplex contains an angle that is too obtuse, including degenerate simplices, an animation artifact may be produced when a sequence of new poses moves from the obtuse point of the simplex to the base of the simplex. These artifacts may be the result of barycentric coordinates jumping, from one frame to the next, very quickly toward a point on the base of the simplex. One example approach that can avoid these artifacts is described in process 500. In the process 500, new references poses are created and the complex is recreated until no simplex has any angle that is too obtuse.

A complex of simplices is built (502). For example, any process that creates a complex of simplices from points in an n-dimensional space may be used. The complex is examined to determine if it contains any flat simplices (504). For example, any process for identifying flat simplices may be used. In one implementation, the height of every simplex may be calculated and compared to the width or the area of the simplices. Any simplex with a ratio lower than a threshold value may be deemed flat. In another implementation, the internal angles of the simplices can be calculated and any angle over a threshold value may be deemed too obtuse. Additionally or alternatively, the absolute value of the height of the simplex and/or the distance between the point of projection on the side of a simplex and the base of the simplex may be measured to identify flat simplices.

If the complex contains one or more flat simplices, a reference pose is added (506), and the complex is rebuilt (502) and reanalyzed (504). Some complexes may contain multiple flat simplices. In some of these cases, the flattest simplex may be corrected for, and then the complex may be rebuilt. In some cases, the n-flattest simplices or all simplices above a threshold flatness metric may be corrected for, and then the complex may be rebuilt.

The reference pose may be created at a point in the complex that would allow the flat simplex to be replaced by two or more simplices that are not flat. One way to identify such a point is to find a point on the base of the simplex (the side opposite the obtuse angle) nearest to the obtuse angle. At this point, a reference pose may be created. In some cases, this reference pose may be the same as the pose of the point of the obtuse angle. When finding weights for a new pose, the weight of this point may be added to the weight of the point of the obtuse angle. Additionally or alternatively, this reference pose may have refinement deformations created by a user, for example the modeler 304 (FIG. 3).

Once the reference pose and refinement deformations are created, with a corresponding point created in the n-dimensional space, the complex may be rebuilt. In some implementations, building this complex can start with the points of the previous flat simplex and the point of the new reference pose. This may, for example, ensure that the flat simplex is not recreated.

If the complex does not contain a flat simplex, it is kept (508). The complex may be, for example, stored in memory and used when determining new deformations for new poses, as previously described.

Figure 6:
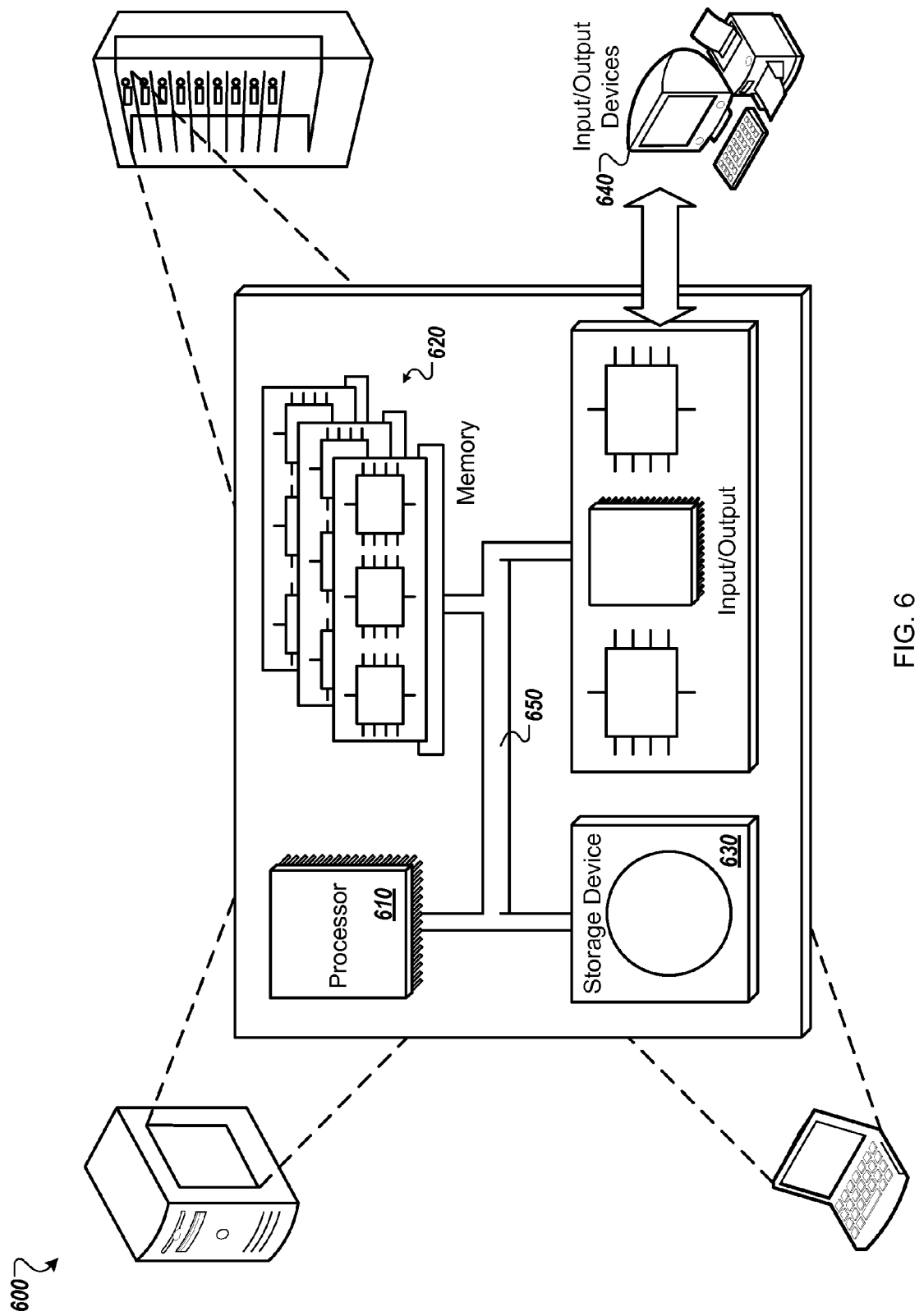
FIG. 6 is a schematic diagram that shows an example of a computing system that can be used in connection with computer-implemented methods and systems described in this document.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. In some implementations, the processor 610 is a general purpose processor. In some implementations, the processor 610 is a specific use processor (e.g., a graphical processing unit). The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method comprising:
   causing an animation rig to be displayed in a plurality of reference poses, the animation rig having a pose deformation in each pose;
   receiving refinement deformations for each reference pose;
   mapping, using one or more processors each refinement deformation to a respective point in n-dimensional space;
   building, using the one or more processors, an initial complex in the n-dimensional space comprising a mesh of simplices, each corner of each simplex associated with one of the deformations;
   identifying, using the one or more processors, a property of a simplex of the initial complex;
   creating, using the one or more processors, and responsive to identifying a property of the initial complex, an additional reference pose having an associated refinement deformation and an associated point in the n-dimensional space; and
   building, using the one or more processors, a complex from the initial complex and the additional reference pose such that no simplex of the complex has the identified property.

2. The method of claim 1, the method further comprising:
   receiving a new pose, the new pose not being one of the reference poses;
   identifying a point in a simplex based on the new pose; and creating a new refinement deformation for the new pose by interpolating the deformations of the simplex for the point, the interpolation being a simplicial interpolation.

3. The method of claim 2, wherein interpolating the deformations of the simplex for the point comprises:
   estimating barycentric weights for the deformations of the simplex for the point, the estimated barycentric weights having an error; and
   adjusting the estimated barycentric weights to reduce the error.

4. The method of claim 2, the method further comprising:
   receiving an animation sequence of new poses;
   creating a sequence of new refinement deformations for the sequence of new poses; and
   creating a refined animation sequence of the new poses in which the new refinement deformations are applied to the new poses.

5. The method of claim 4, the method further comprising:
   displaying the animation sequence to a user;
   receiving an approval input from the user indicating approval of the animation sequence; and
   wherein the sequence of new refinement deformations are created in response to receiving the approval input.

6. The method of claim 2, wherein displaying the animation rig, receiving refinement deformations, and building a complex of simplices is performed at a modeling computer system; and
   receiving a new pose and creating a new refinement deformation is performed at an animation computer system, the modeling computer system and the animation computer system being different computer systems.

7. The method of claim 2, wherein displaying the animation rig, and receiving refinement deformations is performed at a modeling computer system, the method further comprising:
   storing, by the modeling computer system, the refinement deformations in association with the animation rig;
   loading, in an animation computer system that is different than the modeling computer system, the animation rig and the refinement deformations; and
   responsive to loading the refinement deformation, the modeling computer system performs the building a complex of simplices.

8. The method of claim 2, wherein identifying a point in a simplex based on the new pose comprises:
   identifying a new point in the n-dimensional space respective with the new pose, the new point being outside of the complex of simplices; and
   identifying the nearest point in a simplex to the new point.

9. The method of claim 1, wherein each pose is defined as an n-dimensional vector in the n-dimensional space; and
   each element of the vector represents one degree of freedom of one joint of the animation rig.

10. The method of claim 9, wherein the n-dimensional space is six-dimensional space;
    three of the dimensions represent three degrees of freedom of one joint of the animation rig; and
    three of the dimensions represent three degrees of freedom of another joint of the animation rig.

11. The method of claim 1, wherein building a complex of simplices results in a complex of simplices that are non-degenerate.

12. The method of claim 1, wherein building a complex of simplices results in a complex of simplices with no interior angle greater than a threshold angle.

13. The method of claim 1, wherein the poses are defined by m joint deformations, m being greater than n, the method further comprising:
    identifying n dimensions needed to describe the m joint deformations of all poses by principal component analysis.

14. A system comprising:
one or more processors; and
a non-transitory computer-readable medium having stored therein instructions that when executed cause the one or more processors to:
   display an animation rig in a plurality of reference poses, the animation rig having a pose deformation in each pose;
   receive refinement deformations for each reference pose;
   map each refinement deformation to a respective point in n-dimensional space;
   build an initial complex in the n-dimensional space comprising a mesh of simplices, each corner of each simplex associated with one of the deformations;
   identify a property of a simplex of the initial complex;
   create, responsive to identifying a property of the initial complex, an additional reference pose having an associated refinement deformation and an associated point in the n-dimensional space; and
   build a complex from the initial complex and the additional reference pose such that no simplex of the complex has the identified property.

15. A method comprising:
receiving, using one or more processors a) refinement deformations for a plurality of reference poses, b) a mapping of the deformations to an n-dimensional space, and c) a complex of simplices in the n-dimensional space, each corner of each simplex respective with one of the deformations, wherein the refinement deformations comprise:
   first refinement deformations for first reference poses received from user input, wherein an initial complex of simplices built from the first refinement deformations comprises a simplex having a property; and
   an additional refinement deformation for an additional reference pose that is created by the one or more processors in response to identifying the simplex having the property, wherein the complex of simplicies is built from at least the first refinement deformations and the additional refinement deformation such that no simplex of the complex of simplices has the property;
receiving a new pose, the new pose not being one of the reference poses;
identifying a point in a simplex based on the new pose; and
creating, by a computer system, a new refinement deformation for the new pose by interpolating the deformations of the simplex for the point, the interpolation being a simplicial interpolation.

16. The system of claim 14, wherein the complex of simplices contains no non-degenerate simplices.

17. The system of claim 14, the animation system further configured to:
   receive a new pose, the new pose not being one of the reference poses;
   identify a point in a simplex based on the new pose; and
   create a new refinement deformation for the new pose by interpolating the deformations of the simplex for the point, the interpolation being a simplicial interpolation.

18. The system of claim 17, the animation system further configured to:
receiving an animation sequence of new poses;
creating a sequence of new refinement deformations for the sequence of new poses;
creating a refined animation sequence of the new poses in which the new refinement deformations are applied to the new poses.

19. The system of claim 17, wherein to interpolate the deformations of the simplex for the point, the animation system is further configured to:
estimate barycentric weights for the deformations of the simplex for the point, the estimated barycentric weights having an error; and
adjust the estimated barycentric weights to reduce the error.

20. The system of claim 17, wherein in order to identify a point in a simplex based on the new pose, the animation system is further configured to:
identify a new point in the n-dimensional space respective with the new pose, the new point being outside of the complex of simplices; and
identify the nearest point in a simplex to the new point.

21. The system of claim 14, wherein each pose is defined as an n-dimensional vector in the n-dimensional space; and each element of the vector represents one degree of freedom of one joint of the animation rig.

22. The system of claim 14, wherein the complex of simplices contains no interior angle greater than a threshold angle.

23. The system of claim 14, wherein the poses are defined by m joint deformations, m being greater than n, the animation system further configured to:
identify n dimensions needed to describe the m joint deformations of all poses by principal component analysis.

24. A system comprising:
one or more processors; and
a non-transitory computer-readable medium having stored therein instructions that when executed cause the one or more processors to:
receive a) refinement deformations for a plurality of reference poses, b) a mapping of the deformations to an n-dimensional space, and c) a complex of simplices in the n-dimensional space, each corner of each simplex respective with one of the deformations, wherein the refinement deformations comprise:
first refinement deformations for first reference poses received from user input, wherein an initial complex of simplices built from the first refinement deformations comprises a simplex having a property; and
an additional refinement deformation for an additional reference pose that is created by the one or more processors in response to identifying the simplex having the property, wherein the complex of simplices is built from at least the first refinement deformations and the additional refinement deformation such that no simplex of the complex of simplices has the property;
receive a new pose, the new pose not being one of the reference poses;
identify a point in a simplex based on the new pose; and
create, by a computer system, a new refinement deformation for the new pose by interpolating the deformations of the simplex for the point, the interpolation being a simplicial interpolation.

* * * * *